May 10, 1960          H. HERMAN          2,935,793

APPARATUS FOR CO-ORDINATING PHONIC AND VISUAL PERCEPTIONS

Filed Feb. 16, 1956

INVENTOR.
HOWARD HERMAN
BY
Williamson, Schroeder
Adams & Meyers
ATTORNEYS

United States Patent Office 2,935,793
Patented May 10, 1960

2,935,793
APPARATUS FOR CO-ORDINATING PHONIC AND VISUAL PERCEPTIONS

Howard Herman, New York, N.Y.

Application February 16, 1956, Serial No. 565,807

1 Claim. (Cl. 35—8)

This invention relates to the method of and apparatus for entertaining a person and stimulating his imagination and more particularly for causing more complete understanding of concepts and ideas phonically perceived.

Prior to several years ago, most phonograph records produced were primarily for adult usage, and such records were recordings of musical selections for dancing and listening. However, in more recent years, there has been a trend to produce more and more records for children. These children's records are frequently recordings of children's stories, sometimes narratively presented with sound effects and music in the background, and other times presented as a song. Although children may listen attentively to such records, they may not get a complete understanding of all the concepts presented in the record and may not correctly mentally associate the proper things or movements with the ideas or suggestions phonically perceived.

An object of my invention is to provide new and improved apparatus for conveying concepts and ideas, along with those produced by the playing of a phonograph record, for visual perception by a person listening to the record so that the person makes the proper mental association between certain sounds or narratively expressed ideas and the correct object or movement.

Another object of my invention is to provide novel apparatus for stimulating a person's imagination and thoughts by producing, for simultaneous and combined visual and phonic perception, observable movement of elements in conjunction with sounds produced from a moving phonograph record which produces the movement of such elements.

A further object of my invention is the provision of a novel method of more completely conveying to a person ideas and concepts expressed and suggested by phonograph records so the person may make the proper mental associations of his visual and phonic perceptions.

A still further object of my invention is to provide new apparatus which will entertain a person and keep his attention by producing movement of objects in conjunction with the playing of a phonograph record wherein such an object and movement thereof is phonically depicted.

These and other objects and advantages of my invention will more fully appear from the following description made in connection with the accompanying drawings wherein like reference characters refer to similar parts throughout the several views and in which.

Figure 3:
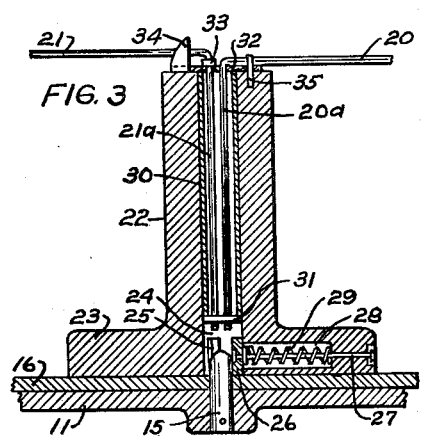
Fig. 3 is a detail vertical section view taken on a substantially vertical plane as indicated at 3—3 of Fig. 2.

The present invention is primarily adapted for use with a phonograph indicated in general by numeral 10 which is of a substantially conventional type and in the form shown, is of the type for playing a single record and requiring manual changing thereof when the record is through playing. The phonograph is provided with a rotary turntable 11 of a conventional type, a pickup arm 12, a start and stop control 13, which controls the rotation of the turntable 11, and an opening 14 in the phonograph case through which amplified sounds reproduced from a record are transmitted. As best seen in Fig. 3, the turntable 11 is provided with a conventionally styled record-centering post 15 which extends upwardly from the turntable 11.

The present invention includes the provision of a record 16 commonly known as a children's type story record which is a recording of sounds commonly related to an object and to occurrences thereof which, when reproduced through the phonograph, phonically depict such an object and occurrences thereof or an account of an incident involving such an object. More specifically the recording may be related to a children's story which may be phonically presented in any of a number of manners including a narrative presentation with sound effects and music in the background, or, a singing or melodic presentation. In whatever form of phonic presentation is used, certain objects are phonically depicted for perception by the listener. In the present embodiment of the invention, the recording on record 16 is related to a bull fight, wherein the objects or characters with which the story is concerned are a bull and a man carrying a sword. The account of the bull fight is phonically depicted and movement of the bull and man may be described narratively or suggested by other sound effect means. Before the recording is finished, the man has thrust his sword into the bull, thereby killing the bull.

Figure 2:
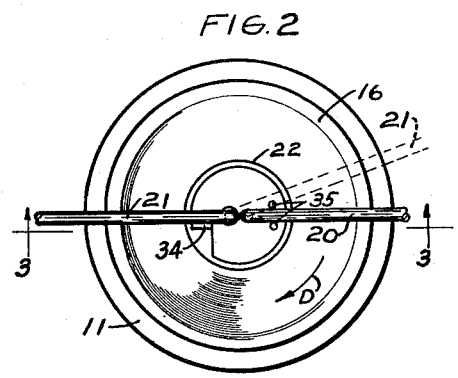
Fig. 2 is a detail top plan view of the invention with portions of the phonograph removed for clarity.

The present invention includes means providing an illustrative element constructed and arranged to at least suggest a physical embodiment for visual perception of the object or objects phonically depicted by the sounds reproduced through the phonograph 10 from record 16. Means are also provided for mounting the illustrative elements for movement in conjunction with the record and for producing at least an illusion of individual movement of at least one of the illustrative elements relative to the record so as to suggest action of the illustrative element as phonically depicted by the recording. In the form shown, such illustrative elements are embodied by a figure of a bull 17 and by a figure of a man 18 carrying a sword 19. In the form shown, these illustrative elements 17 and 18 are mounted on arms 20 and 21 respectively which are supported on a mounting pedestal 22. Pedestal 22 is provided with a flat and enlarged base portion 23 which lies upon the central portion of record 16. Pedestal 22 has a longitudinally extending opening 24 extending through the center thereof for receiving the turntable post 15 therein. Means are provided for securing the pedestal 22 to the post 15 and for centering the pedestal over the post 15 which defines the rotation axis of the turntable and record. In the form shown, the pedestal 22 is provided with a plurality of post-gripping jaws 25 and 26 which are disposed inwardly of the opening 24 in circumferentially spaced relation with each other for engaging circumferentially spaced portions of the outer periphery of post 15 in the manner of a conventional chuck. In the form shown the jaw 26 is shiftably mounted for sliding movement in radial directions inwardly of opening 24 and outwardly into the position shown. Jaw 26 is mounted on a reciprocable rod 27 which is slidably mounted in the base portion 23 of pedestal 22. An elongated chamber 28 is provided for carrying a compression spring 29 which bears against the outer end wall of chamber 28 and against jaw 26, urging jaw 26 radially inwardly. A mounting sleeve 30 is carried in the internal opening 24 of pedestal 22 and has a substantially closed and apertured bottom end 31. An apertured guide plate 32 is at the upper end of pedestal 22 over the opening 24 therein. The apertures in plate 32 and the closed sleeve end 31 are aligned for mounting the inner end portions 20a and 21a of mounting arms 20 and 21 therein. Means are provided for maintaining arm 21 in elevated relation to arm 20 to permit swinging of arm 21 into the dotted position thereof shown in Fig. 2. In the form shown, a small collar or abutment 33 is provided on the mounting portion 21a of arm 21 which bears against the upper portion of plate 32. The arm 21 is free to swing about a vertical axis relative to pedestal 22 and relative to arm 20. An upstanding ear 34 is formed in the plate 32 adjacent arm 21 to restrict counterclockwise rotation thereof. A pair of retaining elements or pins 35 are carried by pedestal 22 on opposite sides of arm 20 for restricting swinging of arm 20 about a vertical axis.

In the operation of the present form of the invention, the phonograph will be started to turn the turntable and record in the direction of arrow D for playing the record through the phonograph. As the record accelerates, the swingable arm 21 and the man 19 will swing from substantially any position such as is shown in dotted lines in Fig. 2 into the full line position thereof wherein arms 20 and 21 are in substantial alignment and extend diametrically of the turntable and record. This movement may suggest that during the initial stages of the bull fight, the man and bull are separated by a substantial distance. As the record plays and the turntable revolves, the bull 17 and the man 18 will revolve with the record and suggests that the man and the bull move around substantially during the course of the bull fight. Near the end of the story as phonically depicted by the recording, the bull is killed by the man and when the phonograph is stopped and the turntable rapidly decelerates, the man 18 swings by inertia around the pedestal and thrusts his sword into the bull and thereby visually depicts the killing of the bull in conjunction with the phonic depiction of the incident. During the course of the bull fight as phonically depicted by the recording the man and bull which are moving in air are maintained in widely spaced relation with each other because of the air resistance which acts upon the man 18 as it is revolved rapidly with the turntable.

Figure 1:
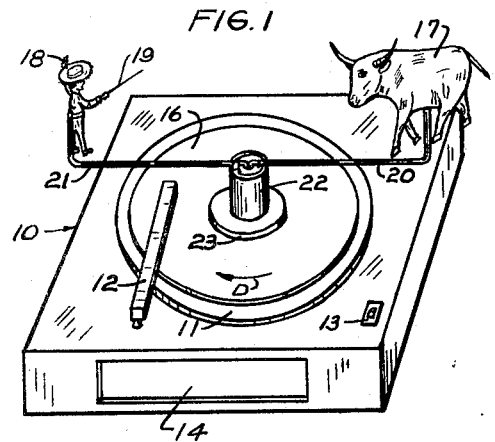
Fig. 1 is a perspective view of one embodiment of the present invention.
Figure 4:
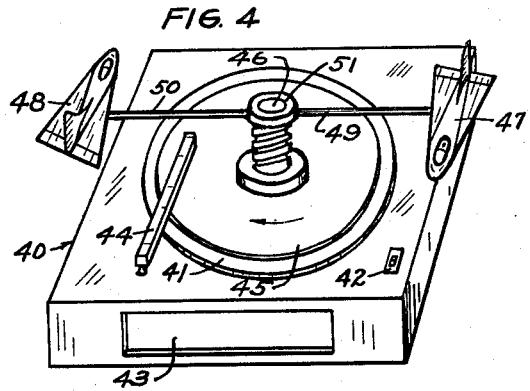
Fig. 4 is a perspective view of another form of the present invention.
Figure 5:
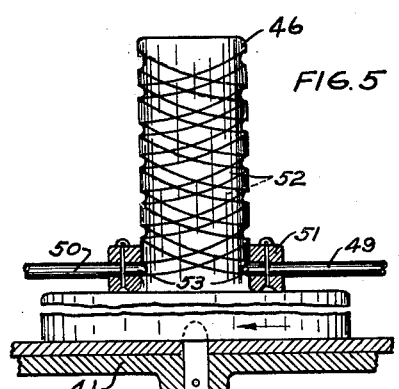
Fig. 5 is a detail view of a portion of the invention shown in Fig. 4 wherein parts of the mechanism are broken away for clarity.

In the form of the invention shown in Figs. 4 and 5, a phonograph 40, substantially identical to that shown in Fig. 1, is provided and has the turntable 41, stop and start control 42, sound discharge transmitting opening 43 and a pickup arm 44. In this form of the invention, the record 45 phonically depicts airplanes and movements thereof when flying. For utilization with this specific embodiment, a mounting pedestal 46 is provided for supporting a pair of airplanes 47 and 48 which visually depict as illustrative elements the concepts and ideas suggested in the recording. Airplanes 47 and 48 are carried on mounting arms 49 and 50 which extend substantially radially outwardly from pedestal 46 and in substantial alignment with each other. The arms 49 and 50 are carried on a mounting ring 51 which encompasses the pedestal 46. Pedestal 46 is provided with a plurality of spirally disposed continuous grooves 52 formed in the outer periphery thereof and extending between the upper and lower ends thereof. Grooves 52 provide a camming guideway for controlling the movement of airplanes 47 and 48. Means are provided for moving mounting ring 51 upwardly and downwardly along pedestal 46 along grooves 52. Such means include a pair of lugs or following elements 53 which protrude inwardly from ring 51 and in the form shown, are formed integrally of the mounting arms 49 and 50. As the ring 51 revolves relative to pedestal 46 the lugs 53 will slide along the grooves 52 upwardly and downwardly along the pedestal 46. It should be noted that the grooves 52 are formed in such a manner that as ring 51 is revolved relative to pedestal 46 the following lugs 53 will follow a course completely to the top of pedestal 46 and then back to the bottom again. In the operation of this form of the invention the phonograph is started for playing the record and the turntable, record 45 and pedestal 46 rapidly accelerate. Because of the inertia of airplanes 47 and 48 and the air resistance acting thereagainst, the airplanes 47 and 48 and ring 51 will not accelerate at the same rate as the record and turntable and as a result, the ring 51 and airplanes 47 and 48 will revolve relative to pedestal 46. As a result of this relative rotation, the airplanes 47 and 48 will be elevated substantially above the record 45 and will, effectively, climb in the manner of airplanes. As the turntable and record continues to revolve, causing a phonic depiction of the act of the airplanes, the airplanes 47 and 48 will gain speed and will approximate the speed of the turntable. However, due to air resistance acting against the planes, they will go somewhat slower than the revolving pedestal and as a result there will be relative rotation between the pedestal 46 and ring 51. This relative rotation results in elevating of the airplanes and lowering thereof to simulate climbing and diving.

When the record is completed, the turntable 41 and record 45 will be rapidly decelerated and the inertia of the airplanes 47 and 48 will carry them around pedestal 46 causing another change in elevation and the airplanes will tend to finish their movement by moving downwardly with respect to pedestal 46, thereby suggesting landing of the airplanes as may be phonically depicted in the recording. If the airplanes 47 and 48 are moving downwardly with respect to the pedestal 46 when the turntable is stopped, the airplanes will continue their downward movement and will stop adjacent the bottom of the pedestal. If the airplanes are moving upwardly on the pedestal, adjacent the top thereof, when the turntable is stopped, the airplanes will continue their upward movement, rotating with respect to the pedestal 46 and then will coast downwardly after having reached the top. If the airplanes are moving upwardly with respect to the pedestal when the turntable is stopped, and are at that moment adjacent the lower portion of the pedestal 46, the airplanes will continue upwardly at least a short distance and may reverse their direction, so as to coast around the pedestal toward the lower end thereof. In any event, the airplanes will assume a position adjacent the lower portion of the pedestal after the turntable is stopped, thereby depicting, or at least suggesting landing of the airplane.

Figure 6:
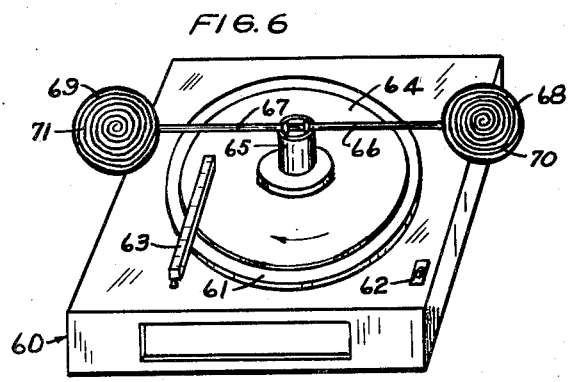
Fig. 6 is a perspective view of still another form of the present invention.
Figure 7:
Fig. 7 is a detail section view of a portion of the invention shown in Fig. 6.

In the form of the invention shown in Figs. 6 and 7, the phonograph 60 is provided with a turntable 61, start and stop control 62, and a pickup arm 63. In this form the record 64 may be a recording to phonically depict movement of flying saucers.

A mounting pedestal 65 is carried on the record 64 and has a pair of radially outstanding arms 66 and 67 affixed thereto. On the outer ends of arms 66 and 67 are provided discs 68 and 69 which are somewhat concave in shape as viewed from the upper side. The discs 68 and 69 are provided with spirally disposed lines or bands 70 and 71 respectively imprinted upon the upper surfaces thereof. In conjunction with the playing of the record 64 which depicts the movement of the flying saucers, the discs 68 and 69 which are constructed to suggest flying saucers, revolve around the rotation axis of turntable 61 with record 64. As the discs 68 and 69 revolve, the spirally disposed lines or bands 70 and 71 create the illusion that the discs 68 and 69 revolve about individual axes in the manner in which flying saucers are thought to move as they travel through space.

From these specific physical embodiments of my invention, the method comprising a portion of my invention will be readily apparent. That method consists in the art of producing proper associations in a person's mind between phonic and visual perceptions, of the method steps of playing a phonograph record and thereby phonically depicting an object and an act or a suggestion of incidents related to the object, and moving an illustrative and observable element designed to suggest such an object in conjunction with the playing of the record and thereby suggesting a relationship between the phonic and visual perceptions related to the object.

It will be seen that I have provided new and improved apparatus for stimulating a person's imagination and creating proper mental associations between phonic perceptions received from the playing of the phonograph record and visual perceptions of objects and movements thereof which are depicted in the phonograph record.

It will, of course, be understood that various changes may be made in the form, details, arrangement and proportions of the parts without departing from the scope of my invention which consists of the matter shown and described herein and set forth in the appended claim.

What is claimed is:

In apparatus for use with a phonograph of the general type having a turntable, said apparatus comprising a disc-type phonograph record mountable on such a turntable for playing by the phonograph, said record phonetically depicting a bull fight wherein the principal characters are a man with a sword and a bull, an upstanding mounting pedestal support on the rotatable record and centrally thereof, said pedestal being rotatable with said record, a pair of support arms extending generally radially outwardly from said pedestal, one of said arms having an inner end fixed to said pedestal and having an outer end with a bull secured thereon, the other of said arms having an inner end swingably mounted on said pedestal for movement about a substantially vertical axis and also having an outer end with a sword-carrying man thereon, said man and bull rotating in air with the record and said man swinging around the pedestal by inertia when the record is rapidly decelerated and causing his sword to be thrust into the bull, whereby to cause mental association of a sword-carrying man and a bull with the phonetic depiction of a bull fight.

References Cited in the file of this patent
UNITED STATES PATENTS

| | | |
|---|---|---|
| 624,397 | Stanton | May 2, 1899 |
| 1,170,325 | Poposkey | Feb. 1, 1916 |
| 1,355,613 | Maier | Oct. 12, 1920 |
| 1,404,194 | Emerson et al. | Jan. 24, 1922 |
| 1,417,060 | Hansley | May 23, 1922 |
| 1,417,061 | Hansley | May 23, 1922 |
| 2,092,761 | Klein | Sept. 14, 1937 |
| 2,323,638 | Wise | July 6, 1943 |
| 2,457,460 | Goodale | Dec. 28, 1948 |

FOREIGN PATENTS

| | | |
|---|---|---|
| 761,555 | France | Jan. 5, 1934 |
| 164,086 | Great Britain | May 23, 1921 |